US012190756B2

(12) United States Patent
Suzuki et al.

(10) Patent No.: US 12,190,756 B2
(45) Date of Patent: Jan. 7, 2025

(54) RESIN FORMED PRODUCT WITH LABEL, PRODUCTION METHOD OF RESIN FORMED PRODUCT WITH LABEL, AND LABEL

(71) Applicant: Yupo Corporation, Tokyo (JP)

(72) Inventors: Tatsuya Suzuki, Kamisu (JP); Atsushi Ishige, Tokyo (JP)

(73) Assignee: Yupo Corporation, Tokyo (JP)

( * ) Notice: Subject to any disclaimer, the term of this patent is extended or adjusted under 35 U.S.C. 154(b) by 862 days.

(21) Appl. No.: 17/290,260

(22) PCT Filed: Jan. 16, 2020

(86) PCT No.: PCT/JP2020/001289
§ 371 (c)(1),
(2) Date: Apr. 30, 2021

(87) PCT Pub. No.: WO2020/153227
PCT Pub. Date: Jul. 30, 2020

(65) Prior Publication Data

US 2022/0020296 A1 Jan. 20, 2022

(30) Foreign Application Priority Data

Jan. 21, 2019 (JP) ................................ 2019-007516

(51) Int. Cl.
*G09F 3/02* (2006.01)
*G09F 3/10* (2006.01)

(52) U.S. Cl.
CPC .................. *G09F 3/02* (2013.01); *G09F 3/10* (2013.01); *G09F 2003/023* (2013.01)

(58) Field of Classification Search
CPC ........ G09F 3/02; G09F 3/10; G09F 2003/023; G09F 2003/0201; G09F 2003/0273; G09F 2003/0202
See application file for complete search history.

(56) References Cited

U.S. PATENT DOCUMENTS 3,245,857 A * 4/1966 Rutledge ............... B29C 66/532 40/310
3,790,439 A * 2/1974 La Perre .................... C09J 7/35 283/64

FOREIGN PATENT DOCUMENTS

JP 2012-215799 A 11/2012
JP 2013-195732 A 9/2013
(Continued)

OTHER PUBLICATIONS

International Search Report of International Patent Application No. PCT/JP2020/001289 completed Mar. 25, 2020 and mailed Apr. 7, 2020 (4 pages).

(Continued)

*Primary Examiner* — Patricia L. Nordmeyer
(74) *Attorney, Agent, or Firm* — Pyprus Pte Ltd; George D. Liu

(57) ABSTRACT

To provide a resin formed product with a label, for which information can be provided on the label without using ink and the information can be visually recognized from the external appearance even in a condition where the label is adhered. A resin formed product 20 to which a label 10 is adhered, the label 10 being formed by laminating a layer containing a porous base layer A and an adhesive layer B adhered to a surface of the resin formed product. On the label 10, a rough part 11 having a relatively rough surface roughness and a smooth part 12 having a predetermined pattern having a relatively smooth surface roughness are formed, and a cross-sectional porosity of the label of the smooth part 12 is from 0 to 93% relative to the cross-sectional porosity of the label of the rough part 11.

5 Claims, 5 Drawing Sheets

(56) References Cited

FOREIGN PATENT DOCUMENTS

| | | | |
|---|---|---|---|
| JP | WO2017/188298 | A1 | 11/2017 |
| WO | WO98/32598 | A1 | 7/1998 |

OTHER PUBLICATIONS

Written Opinion of International Patent Application No. PCT/JP2020/001289 completed Mar. 25, 2020 and mailed Apr. 7, 2020 (4 pages).

* cited by examiner

| | | Zygo IMAGE | Rza／Rzr |
|---|---|---|---|
| REFERENCE EXAMPLE | ROUGH PART |  | - |
| COMPARATIVE EXAMPLE 3 | |  | 0.6 |
| EXAMPLE 4 | SMOOTH PART |  | 0.4 |
| EXAMPLE 5 | |  | 0.3 |

RESIN FORMED PRODUCT WITH LABEL, PRODUCTION METHOD OF RESIN FORMED PRODUCT WITH LABEL, AND LABEL

TECHNICAL FIELD

The present invention relates to a resin formed product, such as a bottle-shaped container, to which a label is adhered, and a production method thereof.

The present invention also relates to a label used for being adhered to a surface of a resin formed product.

BACKGROUND ART

In the related art, a technology for integrating a label and a resin formed product by inserting the label in advance in a mold and then forming the resin formed product such as a container by injection forming, blow forming, differential pressure forming, or foam molding in the mold has been known. Such a forming method of a resin formed product with a label is called in-mold molding.

Furthermore, in recent years, from the perspective of collecting and utilizing plastic containers, there is a demand for easy separation of a label from a plastic container to which the label has been adhered by in-mold molding. In order to meet such demand, provision of a layer that can undergo interfacial peeling or delamination in a label for in-mold molding has been proposed. For example, provision of a heat seal layer formed from, for example, a high density polyethylene in an adhesive layer for a resin formed product in an in-mold molding label has been known. This type of label can achieve a strong adhesive force to a formed product in a case where the material of the resin formed product is the same polyethylene resin as that of a heat seal layer. Furthermore, an in-mold molding label having, in place of the heat seal layer, a porous layer having openings on a surface for an adhesive layer to a resin formed product has been also known (Patent Document 1). An in-mold molding label having such a porous layer exhibits anchoring effect which allows a resin to enter into openings of a porous layer surface by pressure applied at the time of forming. Thus, firm adhesion between the label and the resin formed product can be achieved without limitation on the material of the resin formed product, and easy separation of the label from the resin formed product can be also achieved.

Furthermore, for an in-mold molding label containing a porous layer on an adhering face to a resin formed product, a technology that provides printed information on the porous layer of this label in advance has been also proposed (Patent Document 2). That is, when the label is released from the resin formed product, if the printed information can appear on both released faces (exposed faces) of the resin formed product and the label, this information can be utilized for various purposes, which is useful. For example, by specifying the resin formed product from which the label was released based on the printed information, reuse or counterfeiting of the resin formed product can be prevented. Furthermore, by using the printed information appeared on the released face of the resin formed product after the label has been released, it is possible to inform a consumer of, for example, precautions or product information. Furthermore, secondary use of the released label as, for example, a coupon is also possible.

CITATION LIST

Patent Literature

Patent Document 1: JP 2012-215799 A
Patent Document 2: WO 2017/188298

SUMMARY OF INVENTION

Technical Problem

The in-mold molding label described in Patent Document 1 allows the printed information to appear on both release faces of the resin formed product and the label when the label is released from the resin formed product mainly by filling a colorless ink composition in the porous layer of the label. However, the printed information cannot be visually observed from the external appearance in a condition where the label is adhered to the resin formed product and can be visually recognized for the first time after the label is released. Such constraints may work advantageously; however, there are demands for confirming the printed information even in a condition where the label is adhered to the resin formed product when the label is provided with the printed information. For example, in a case where it is necessary to inform a consumer of precautions or product information by the printed information provided on the label, the printed information is preferably visually confirmable even before the label is released. Furthermore, for example, in a case where the anti-counterfeiting of the resin formed product is expected, the anti-counterfeiting effect can be further enhanced if identical or corresponding printed information is provided on the total of three locations, including a label surface in a condition where the label is adhered to the resin formed product, a released face of the resin formed product after the label is released, and a released face of the label itself.

Furthermore, for the in-mold molding label described in Patent Document 1, to provide the printed information, special treatment of filling the colorless ink composition to the porous layer of the label is required. Thus. there are problems such as needs for printing cost or needs for a special device to perform the printing treatment. In particular, a typical label requires printing of, for example, product information with color ink on its surface side; however, when another printed information is provided with colorless ink on a porous layer corresponding to the back surface side thereof, there is a problem of increase in cost due to increased printing process because double-side printing using various inks for one sheet of label is required.

An object of the present invention is to provide a resin formed product with a label, for which information can be provided on the label without using ink and the information can be visually recognized from the external appearance even in a condition where the label is adhered.

Solution to Problem

As a result of diligent research on means to solve the problems in the related art, the inventors of the present invention found that, by integrating a label and a resin formed product by in-mold molding after subjecting the label containing a porous base layer and an adhesive layer to pretreatment that partially reduces a cross-sectional porosity thereof, a surface roughness of the part to which the pretreatment was performed becomes smoother than the other parts. By utilizing the phenomenon described above, information that can be visually recognizable from the external appearance can be provided on the label utilizing a difference in the surface roughness between the part to which the pretreatment of the label was performed and the other part. Therefore, the inventors of the present invention considered that the problems in the related art can be solved based on the knowledge described above and thus completed the present invention. Hereinafter, the configuration and the steps of embodiments of the present invention will be described in detail.

The first aspect of the present invention relates to a resin formed product 20 to which a label 10 is adhered. In an embodiment of the present invention, the label 10 is formed from a multilayer structure formed by laminating a layer containing a porous base layer (A) and an adhesive layer (B) adhered to a surface of the resin formed product 20. On the label 10 adhered to the resin formed product 20, a rough part 11 having a relatively rough surface roughness and a smooth part 12 having a predetermined pattern 12*a* having a relatively smooth surface roughness are formed. In a case where the cross-sectional porosity of the label 10 of the rough part 11 is 100%, the cross-sectional porosity of the label 10 of the smooth part 12 is from 0 to 93%.

For example, by performing pretreatment, such as hot-press treatment, in a predetermined pattern for the label 10, the cross-sectional porosity of the label 10 can be reduced, and the part having a reduced porosity becomes the smooth part 12 having a relatively smooth surface roughness. Meanwhile, the part having a high cross-sectional porosity of the label 10 becomes the rough part 11 having a rough surface roughness due to the effect of fine voids encapsulated therein. By utilizing the difference between the surface roughnesses of the rough part 11 and the smooth part 12, information with a predetermined pattern can be provided on the label 10 surface without use of ink. Furthermore, in the smooth part 12, the internal part thereof does not have fine voids or, even when fine voids exist, the size or the number of the fine voids are reduced compared to those of the rough part 11. In this way, because the smooth part 12 is a part at least having a physical structure of the porous base layer (A) that is different from that of the rough part 11, the pattern expressed by this smooth part 12 can be visually recognized from the front surface side of the label 10. Therefore, even in a condition where the label 10 is being adhered to the resin formed product 20, the pattern of the smooth part 12 can be visually recognized from the external appearance. In particular, by setting the cross-sectional porosity of the label 10 of the smooth part 12 to from 0 to 93% relative to the rough part 11, the pattern of the smooth part 12 becomes remarkable to a degree that is easily visually recognizable.

In the resin formed product with a label according to an embodiment of the present invention, when the surface roughness (specifically, ten point height of roughness profile) of the rough part 11 is $Rz_r$ and the surface roughness of the smooth part 12 is $Rz_a$, the $Rz_r$ is preferably 25 μm or greater, and $Rz_a/Rz_r$ is preferably less than 0.6. By satisfying the conditions, the difference between the rough part 11 and the smooth part 12 are especially clearly expressed, and it becomes easier to read the information expressed by the pattern of the smooth part 12.

In the resin formed product with a label according to an embodiment of the present invention, the smooth part 12 is preferably formed by heating and pressuring from a front surface side or a back surface side before the label 10 is adhered to the resin formed product. As described above, by performing so-called hot-press treatment, the porosity of the label 10 can be easily locally reduced, and a partial smooth part 12 can be easily formed.

In the resin formed product with a label according to an embodiment of the present invention, the adhesive layer (B) may have a porous adhesive layer (B1). In this case, when the label 10 is released from the resin formed product 20 by splitting the porous adhesive layer (B1), patterns 12*b*, 12*c* corresponding to the smooth part 12 preferably appear respectively on a released face of the released part 10*a* of the label that has been released from the resin formed product 10 and a released face of the remained part 10*b* of the label that remains on the resin formed product 20. Note that the released face means a face exposed by the release of the label 10. In the present embodiment, the smooth part 12 of the label becomes a part in which both cross-sectional porosities of the porous base layer (A) and the porous adhesive layer (B1) are reduced. Thus, even when the label 10 is split in the porous adhesive layer (B1), the smooth part 12 is present on both of the released face of the released part 10*a* and the released face of the remained part 10*b* of the label. Thus, the patterns 12*b*, 12*c* corresponding to the smooth part 12 respectively appear on the released part 10*a* and the remained part 10*b* of the label. Note that the pattern of the remained part 10*b* is identical to the pattern of the smooth part 12; however, the pattern 12*b* of the released part 10*a* becomes mirror-image symmetry of the pattern of the smooth part 12. In this manner, because identical or corresponding information can be provided on the total of three locations, including the label 10 surface in a condition where the label 10 is adhered to the resin formed product 20, a released face of the resin formed product 20 after the label 10 is released, and a released face of the label 10 itself, for example, reuse or counterfeiting of the resin formed product 20 can be more effectively prevented.

In the resin formed product with a label according to an embodiment of the present invention, the adhesive layer (B) may have a heat seal layer (B2) that does not contain voids in the layer. In this manner, by providing the heat seal layer (B2) in the adhesive layer (B), for example, in a case where the material of the resin formed product 20 is identical or similar to the resin material of the heat seal layer (B2), the label 10 can be firmly adhered to the resin formed product 20. Note that the adhesive layer (B) may have both the porous adhesive layer (B1) and the heat seal layer (B2). In this case, any one of the porous adhesive layer (B1) or the heat seal layer (B2) may be used as an adhering face to the resin formed product 20.

The second aspect of the present invention relates to a method of producing a resin formed product 20 to which a label 10 is adhered. The label 10 is formed by laminating a layer containing a porous base layer (A) and an adhesive layer (B) adhered to a surface of the resin formed product 20. The production method according to an embodiment of the present invention includes a hot-press step and an in-mold step. The hot-press step is a step of forming a hot-pressed part 12' having a predetermined pattern by heating and pressuring from a front surface side or a back surface side of the label 10. The in-mold step is a step of inserting the label 10 having the hot-pressed part 12' in a mold and integrating the label 10 and the resin formed product 20 in the mold. By this, on the surface of the label 10 integrated with the resin formed product 20, a rough part 11 having a relatively rough surface roughness and a smooth part 12 corresponding to the pattern of the hot-pressed part 12' and having a relatively smooth surface roughness are formed. According to this production method, the resin formed product with a label according to the first aspect described above can be efficiently produced.

In the production method according to an embodiment of the present invention, a non-hot-pressed part 11' (that is, the region corresponding to the rough part 11) other than the hot-pressed part 12' of the label 10 has rougher surface roughness after the in-mold step. That is, in the label 10, at the stage after the hot-press step, the surface roughness of the hot-pressed part 12' is almost identical to the surface roughness of the non-hot-pressed part 11' that is other than the hot-pressed part 12'. Meanwhile, in the label 10, the surface roughness of the non-hot-pressed part 11' becomes rough after the label 10 undergoes the in-mold step. By using the characteristics of the label 10 described above, for example, it is possible to confirm that the label 10 has been adhered to the resin formed product 20 by the regular in-mold step at first glance, and thus counterfeiting of the resin formed product 20 can be prevented. That is, even when an imitator separately acquired or counterfeited the label 10 and the resin formed product 20 and adhered these by an adhesive agent or the like, a counterfeit produced as described above does not have a difference between the surface roughnesses of the rough part 11 and the smooth part 12, unlike the genuine product, and thus it is difficult to visually recognize the pattern of the smooth part 12. On the other hand, by integrating the label 10 and the resin formed product 20 through the regular in-mold step, for the first time, the rough part 11 of the label 10 becomes rough, and the pattern of the smooth part 12 stands out. Because of this, by confirming the condition of the label 10, a genuine product and a counterfeit can be easily distinguished.

The third aspect of the present invention relates to a label mainly used for being adhered to the resin formed product 20. The label 10 according to an embodiment of the present invention has a multilayer structure formed by laminating a layer containing a porous base layer (A) and an adhesive layer (B). The label 10 has a first part 11' having a relatively high cross-sectional porosity and a second part 12' having a relatively low cross-sectional porosity. In this case, the cross-sectional porosity of the label of the second part 12' is from 0 to 93% relative to the cross-sectional porosity of the label of the first part 11'. Note that, by adhering the resin formed product 20 and this label 10 by the in-mold step, the first part 11' becomes the rough part 11 described above, and the second part 12' becomes the smooth part 12 described above.

Advantageous Effects of Invention

According to the present invention, a resin formed product with a label, for which information can be provided on the label without using ink and the information can be visually recognized from the external appearance even in a condition where the label is adhered, can be provided.

BRIEF DESCRIPTION OF DRAWINGS

FIG. 2(*a*) illustrates a condition where a label is adhered to the resin formed product, and FIG. 2(*b*) illustrates a condition where the label is released from the resin formed product.

DESCRIPTION OF EMBODIMENTS

Embodiments of the present invention are described below using drawings. The present invention is not limited to the embodiments described below and includes those appropriately modified from the embodiments described below in a range that is obvious to a person skilled in the art.

Note that, in the specification of the present invention, "A to B" means "A or greater and B or less".

1. First Embodiment

Figure 1:
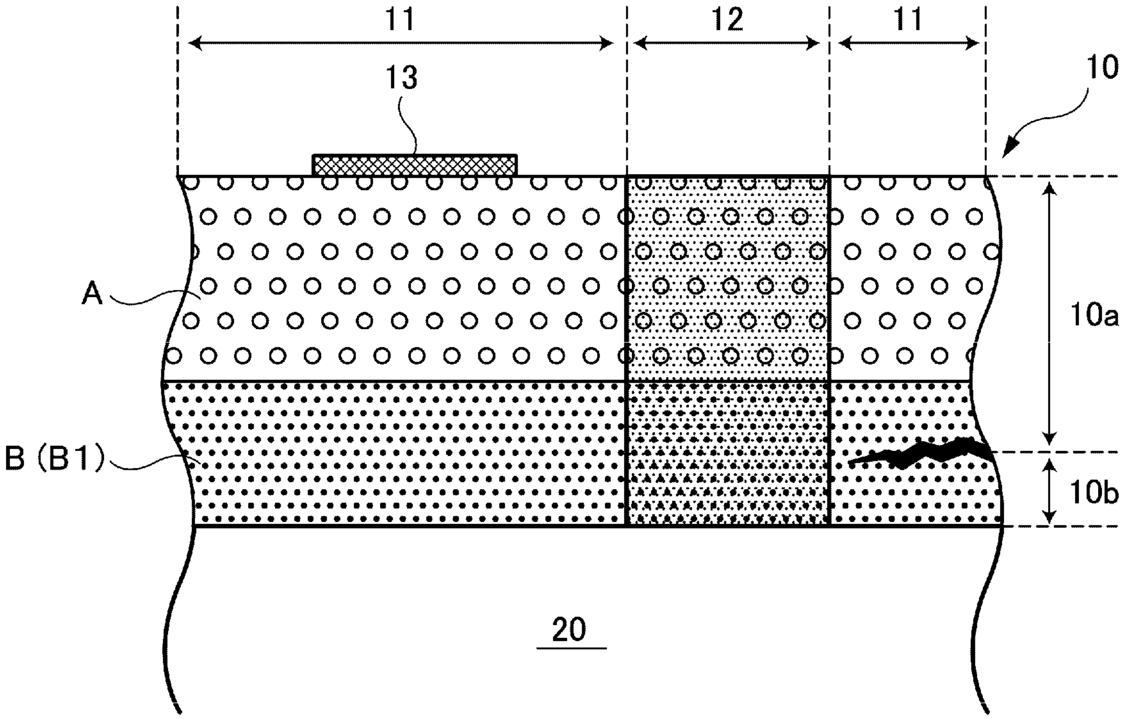
FIG. 1 schematically illustrates a cross sectional structure of a resin formed product with a label according to the first embodiment.
Figure 2:
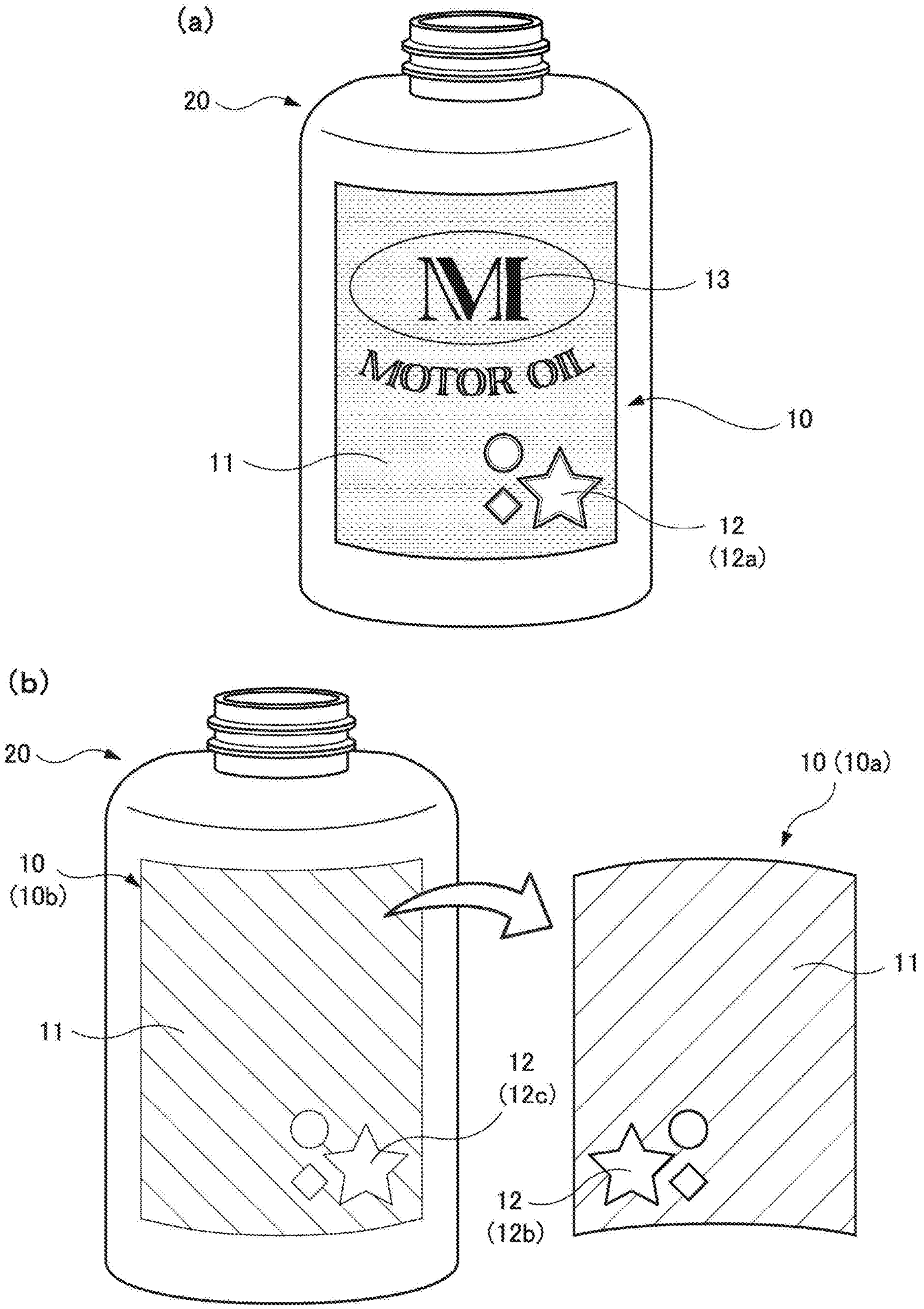
FIG. 2 illustrates a resin formed product with a label according to the first embodiment.

FIG. 1 and FIG. 2 illustrate the resin formed product with a label according to the first embodiment of the present invention. As illustrated in these figures, the label 10 is adhered to a surface of the resin formed product 20. In an embodiment of the present invention, the label 10 is preferably adhered to the resin formed product 20 by in-mold molding. The resin formed product 20 is not particularly limited, and resin formed products for various use, such as known containers for oils, containers for pharmaceuticals, or containers for food, can be used.

As illustrated in FIG. 1, the label 10 has a structure in which the porous base layer (A) and the adhesive layer (B) are laminated. The adhesive layer (B) is a layer that is adhered to the resin formed product 20, and the porous base layer (A) is laminated on this adhesive layer (B). On the porous base layer (A), any printing can be performed by using a known ink composition 13. Furthermore, in the first embodiment, the adhesive layer (B) is formed from the porous adhesive layer (B1).

As illustrated in FIG. 2(*a*), on the label 10, a rough part 11 having a relatively rough surface roughness and a smooth part 12 having a relatively smooth surface roughness are formed. Therefore, when the resin formed product 20 to which the label 10 is adhered is seen from the front surface side, due to the difference in the surface roughnesses of these rough part 11 and the smooth part 12, the pattern of the smooth part 12 (surface pattern 12*a*) will stand out and be seen on the rough part 11. Specifically, because the reflectance of light differs between the rough part 11 and the smooth part 12, the pattern of the smooth part 12 will be visually recognized. Note that, like an example illustrated in the figure, a condition where the pattern of the smooth part 12 is formed in the rough part 11 by increasing the proportion of the rough part 11 and reducing the proportion of the smooth part 12 relative to the entire area of the label 10 is preferably formed; however, on the other hand, it is also possible to reduce the proportion of the rough part 11 and increase the proportion of the smooth part 12. Furthermore, the ink composition 13 for printing can be not only adhered to the rough part 11 but also to the smooth part 12.

Furthermore, in the first embodiment, from the condition where the label 10 is adhered to the resin formed product 20, the label 10 can be released from the resin formed product 20 as illustrated in FIG. 2(*b*). At this time, the label 10 is split in the porous adhesive layer (B1) and separated into a released part 10*a* separated from the resin formed product 20 and a remained part 10*b* remained on the surface of the resin formed product 20. In other words, as illustrated in FIG. 1, when an attempt is made to release the label 10 from the resin formed product 20, the end face of the porous adhesive layer (B1) is cut and the cut expands. Thus, the porous adhesive layer (B1) is divided into two in the thickness direction. Because of this, the released part 10*a* of the label 10 contains the porous base layer (A) and the porous adhesive layer (B1), and the remained part 10*b* of the label 10 is only formed from the porous adhesive layer (B1).

Furthermore, in the first embodiment, also in the released part 10*a* and the remained part 10*b* after the label 10 is released, a pattern appears corresponding to the pattern (surface pattern 12*a*) of the smooth part 12 that appears on the surface of the label 10 in a condition where the label 10 is adhered to the resin formed product 20. That is, a mirror image pattern 12*b* that is mirror-image symmetry of the surface pattern 12*a* appears on the released face (face exposed by releasing the label 10) of the released part 10*a* of the label 10, and an identical pattern 12*c* that is identical to the surface pattern 12*a* appears on the released face of the remained part 10*b* of the label 10. These mirror image pattern 12*b* of the released part 10*a* and identical pattern 12*c* of the remained part 10*b* are parts having a relatively smooth surface roughness compared to the other parts, like the surface pattern 12*a* of the label 10 surface, and the specific pattern appears on the surface due to the difference between the surface roughnesses thereof. As will be described in greater detail below, by subjecting the label 10 to hot-press treatment, the porosities of the porous base layer (A) and the porous adhesive layer (B1) of the label 10 are decreased, and the part with the lowered porosities becomes the smooth part 12 having a relatively smooth surface roughness. In this manner, by forming a part having a lower porosity in the porous adhesive layer (B1) split during release of the label 10, when the porous adhesive layer (B1) is split into two, a pattern corresponding to the pattern of the smooth part 12 appears on the released face thereof.

The structure of the label 10 having the characteristics described above will be described in detail below.

1-1. Porous Base Layer (A)

The porous base layer (A) is a layer containing a thermoplastic resin and containing a large number of fine voids having fillers as cores. That is, by stretching the thermoplastic resin film containing fillers, fine voids are generated in an inner part of the film. Furthermore, by allowing the porous base layer (A) to contain a thermoplastic resin, for example, mechanical strength such as stiffness, water resistance, chemical resistance and, as necessary, opacity can be imparted to the label 10. The porous base layer (A) has the strength that is higher than the strength of the porous adhesive layer (B1), and the porous base layer (A) has a strength that does not break itself when the label 10 is released by holding the porous base layer (A). For example, the cohesive force of the porous base layer (A) itself (peel strength or tensile strength at break) is preferably 200 gf/15 mm or greater.

Thermoplastic Resin

The thermoplastic resin used for the porous base layer (A) is not particularly limited, and examples thereof include polyolefin-based resins, such as polyethylene-based resins, polypropylene-based resins, polybutene, and 4-methyl-1-pentene (co)polymers; functional group-containing olefin-based resins, such as ethylene-vinyl acetate copolymers, ethylene-(meth)acrylic acid copolymers, metal salts (ionomers) of ethylene-(meth)acrylic acid copolymers, ethylene-(meth)acrylic acid alkyl ester copolymers (the number of carbons of the alkyl group is preferably from 1 to 8), maleic acid-modified polyethylene, and maleic acid-modified polypropylene; polyester-based resins, such as aromatic polyester (e.g., polyethylene terephthalate, polybutylene terephthalate, and polyethylene naphthalate), and aliphatic polyester (e.g., polybutylene succinate and polylactic acid); polyamide-based resins, such as nylon-6, nylon-6,6, nylon-6,10, and nylon-6,12; styrene-based resins, such as syndiotactic polystyrene, atactic polystyrene, acrylonitrile-styrene (AS) copolymers, styrene-butadiene (SBR) copolymers, and acrylonitrile-butadiene-styrene (ABS) copolymers; polyvinyl chloride resins; polycarbonate resins; and polyphenylene sulfide. Two or more types of these resins may also be mixed and used.

In particular, from the perspective of high water resistance and transparency and ease in forming a resin film, as the thermoplastic resin forming the porous base layer (A), a polyolefin-based resin or a polyester-based resin is preferably employed. From the perspective of formability of a film, a polypropylene-based resin is more preferred among the polyolefin-based resins, and polyethylene terephthalate is even more preferred among the polyester-based resins. The effect of the present invention is remarkable when a polyolefin-based resin is used.

Examples of the polypropylene-based resin include, in addition to isotactic homopolypropylene formed by homopolymerizing propylene, syndiotactic homopolypropylene, polypropylene-based copolymers having various stereoregularity and being formed by subjecting propylene to copolymerization with α-olefine such as ethylene, 1-butene, 1-pentene, 1-hexene, 4-methyl-1-pentene, 1-heptene, and 1-octene. The polypropylene-based copolymer may be a bipolymer, a terpolymer, or a multiple component polymer, and may be a random copolymer or a block copolymer.

Fillers

The porous base layer (A) contains fillers to form a large number of fine voids in an inner part of the thermoplastic resin. Examples of the fillers include inorganic fillers and organic fillers, and these can be used alone or a combination of these can be used. In a case where the thermoplastic resin film containing fillers is stretched, a large number of fine voids having the fillers as cores is formed in the thermoplastic resin film inner part. Furthermore, the stiffness, whiteness, and opacity of the porous base layer (A) may be adjusted by the fillers.

Examples of the inorganic fillers include heavy calcium carbonate, light calcium carbonate, baked clay, talc, diatomaceous earth, titanium oxide, zinc oxide, barium sulfate, silicon oxide, magnesium oxide, and inorganic particles obtained by subjecting these to surface treatment using fatty acids, high molecular surfactants, and antistatic agents. Among these, heavy calcium carbonate, light calcium carbonate, baked clay, or talc is preferred from the perspectives of void formability and low cost. From the perspective of enhancing whiteness and opacity, titanium oxide, zinc oxide, or barium sulfate is preferred.

The organic fillers are not particularly limited but are preferably organic particles that are immiscible with the thermoplastic resin, that have the melting point or glass transition temperature higher than that of the thermoplastic resin, and that are finely dispersed under the melt-kneading conditions of the thermoplastic resin. In a case where the thermoplastic resin is a polyolefin-based resin, examples of the organic fillers include organic particles of polyethylene terephthalate, polybutylene terephthalate, polyethylene naphthalate, polystyrene, polyamide, polycarbonate, polyethylene sulfide, polyphenylene sulfide, polyimide, polyether ketone, polyether ether ketone, polymethyl methacrylate, poly-4-methyl-1-pentene, homopolymers of cyclic olefin, or copolymers of cyclic olefin and ethylene. Furthermore, fine powder of thermosetting resin, such as melamine resin, may be used, and insolubilization by crosslinking a thermoplastic resin is also preferred. Note that the melting point (° C.) and the glass transition temperature (° C.) of the resin can be measured by differential scanning calorimetry (DSC).

Furthermore, as the inorganic fillers and the organic fillers, one type selected from these may be used alone, or a combination of two or more types of these may be used. When two or more types are combined, the combination may be a combination of inorganic fillers and organic fillers.

The average particle sizes of the inorganic fillers and the organic fillers are preferably large from the perspective of ease in mixing with the thermoplastic resin. Furthermore, the average particle sizes of the inorganic fillers and the organic fillers are preferably small from the perspective of preventing occurrence of troubles such as sheet breakage during stretching or reduction in strength of the porous base layer in a case where opacity or printability is enhanced by forming voids in the inner part by stretching. Specifically, the average particle sizes of the inorganic fillers and the organic fillers are preferably 0.01 μm or greater, more preferably 0.1 μm or greater, and even more preferably 0.5 μm or greater. Furthermore, the average particle size is preferably 30 μm or less, more preferably 20 μm or less, and even more preferably 15 μm or less.

For the average particle sizes of the inorganic fillers and the organic fillers, a cut face of the thermoplastic resin film is observed by an electron microscope, and the average value of maximum diameters obtained by measuring at least 10 particles can be determined as the average dispersion particle size at the time when the inorganic fillers and the organic fillers are dispersed in the thermoplastic resin by melt-kneading and dispersing.

The content of the fillers in the porous base layer is preferably 1 mass % or greater, more preferably 3 mass % or greater, and even more preferably 5 mass % or greater, to form desired voids in the layer. From the perspective of enhancing handleability by imparting stiffness to the label, the content of the fillers in the porous base layer is preferably 45 mass % or less, more preferably 40 mass % or less, and even more preferably 35 mass % or less.

1-2. Porous Adhesive Layer (B1)

The porous adhesive layer (B1) is a layer containing a large number of fine voids opening toward the surface thereof, and is mainly utilized to bind the resin formed product 20. In other words, in a case where the label 10 and the resin formed product 20 are integrated by the in-mold molding, due to the resin pressure at the time of forming of the resin formed product 20, the resin formed product 20 molten resin enters the voids on the porous adhesive layer (B1) surface, and the label 10 and the resin formed product 20 are bound by the anchoring effect thereof. Because of this, the label 10 can be adhered to the resin formed product 20 regardless of the material of the resin formed product 20. Furthermore, the porous adhesive layer (B1) is a layer that is brittle and has a lower strength than the porous base layer (A). Thus, when the label 10 is released from the resin formed product 20 by pulling the porous base layer (A), the porous adhesive layer (B1) readily undergoes cohesive failure. By this, the porous base layer (A) can be easily released from the resin formed product 20. Note that, because the porous adhesive layer (B1) contains a large number of communicating voids in the inner part, when the label 10 is adhered to the resin formed product 20, even when air remains in between the label 10 and the resin formed product 20, the air is pushed by the resin and discharged outside through the voids of the porous adhesive layer (B1). Because of this, expansion of the label 10 due to air remained in between the resin formed product 20 and the label 10 does not occur.

The material of the porous adhesive layer (B1) is not particularly limited and a resin film that contains a blended material of a crystalline polypropylene resin and a thermoplastic resin and fillers and that is stretched is preferably used. In particular, for the thermoplastic resin, a material that is immiscible with the crystalline polypropylene resin is preferably used. As described above, the release of the label 10 is achieved by cohesive failure of the porous adhesive layer (B1). For this, the porous adhesive layer (B1) is formed by using at least two types of resins that are immiscible to each other as the resin materials constituting the porous adhesive layer (B1), and stretching a blended material of the resins in a condition of phase separation. By this, when the porous adhesive layer (B1) is broken, release occurs at the interface between these resins as well as the interface between the resins and the voids, and it becomes possible to release the porous adhesive layer (B1) in a uniform sheet form.

Crystalline Polypropylene Resin

For the crystalline polypropylene resin, a polypropylene-based resin having a degree of crystallinity of 65% or greater is preferably used. The degree of crystallinity of the crystalline polypropylene is more preferably 66% or greater, and particularly preferably from 67 to 80%. When the degree of crystallinity is 65% or greater, the effect of the expected interfacial peeling is readily obtained because dissolution of the amorphous part of the crystalline polypropylene resin and the thermoplastic resin is less likely to proceed, the stress required for release (peel strength) can be made adequately small. Furthermore, when the degree of crystallinity is 80% or less, acquisition is easy commercially.

Immiscible Thermoplastic Resin

Examples of the thermoplastic resin that is immiscible with the crystalline polypropylene resin include polyethylene resins, styrene-based resins, cyclic polyolefin resins, ethylene-cyclic olefin copolymer resins, propylene-α-olefin copolymer resins, polyamide-based resins such as nylon-6, nylon-6,6, nylon-6,10, and nylon-6,12, polyethylene terephthalate and copolymers thereof, polyethylene naphthalate, polybutylene terephthalate, polybutylene succinate, polylactic acid, thermoplastic polyester-based resins such as aliphatic polyester, and polycarbonate. Two or more types of these may also be mixed and used. Among these, from the perspectives of chemical resistance and production cost, use of a polyethylene resin is preferred. Due to the presence of the immiscible thermoplastic resin, interfacial peeling occurs between the immiscible thermoplastic resin in the crystalline polypropylene resin and the polypropylene resin during production of stretched film, and thus releasability is enhanced. Adequate releasability tends to be achieved by setting the amount of the immiscible thermoplastic resin to 105 to 300 parts by weight per 100 parts by weight of the polypropylene resin. Note that, in the present specification, “immiscible” refers to having morphology of sea-island structure in a case where a blended product of a crystalline polypropylene resin and an immiscible thermoplastic resin is observed by using an electron microscope, and the size of the structure thereof is from 0.3 to 10 μm.

Fillers

As the fillers contained in the porous adhesive layer (B1), both or one of inorganic fillers and/or organic fillers can be used, basically, in the same manner as the fillers of the porous base layer (A). However, for the fillers of the porous adhesive layer (B1), fillers in which the surface is hydrophilization-treated with a surface treatment agent may be employed. For example, by forming the porous adhesive layer (B1) using hydrophilization-treated inorganic fillers, interfacial peeling between the inorganic fillers and the crystalline polypropylene in the porous adhesive layer (B1) tends to occur, and thus release of the label 10 from the resin formed product 20 is further facilitated. For the surface treatment agent and the method of surface treatment, those described in Patent Document 2 (WO 2017/188298) may be referred.

The content of the blended material of the crystalline polypropylene resin and the immiscible thermoplastic resin is preferably from 30 to 60 wt. %, and more preferably from 35 to 50 wt. %, per 100 wt. % total of the porous adhesive layer (B1). Furthermore, the content of the fillers in the porous adhesive layer (B1) is preferably from 40 to 70 wt. %, and more preferably from 50 to 65 wt. %. When the content of the fillers in the porous adhesive layer (B1) is 40 wt. % or greater, adequate releasability tends to be obtained. Furthermore, when the content is 70 wt. % or less, forming stability tends to be achieved. In the blended material, the blended proportion of the immiscible thermoplastic resin in the crystalline polypropylene resin is preferably from 105 to 300 parts by weight, more preferably from 120 to 280 parts by weight, and even more preferably from 140 to 270 parts by weight, per 100 parts by weight of the crystalline polypropylene resin.

1-3. Rough Part and Smooth Part

In an embodiment of the present invention, the surface of the label 10 adhered to the resin formed product 20 is divided into the rough part 11 (part having a relatively rough surface roughness) and the smooth part 12 (part having a relatively smooth surface roughness) in a visually recognizable manner. Because of this, for example, by forming a predetermined surface pattern 12*a* by the smooth part 12, information can be presented for consumers, for example. Note that it is also possible to present information by forming a pattern by the rough part 11.

In a condition where the label 10 is adhered to the resin formed product 20 (see FIG. 2(*a*)), when the surface roughness of the rough part 11 is $Rz_r$ and the surface roughness of the smooth part 12 is $Rz_a$, it is preferred to set the $Rz_r$ to 25 μm or greater and $Rz_a/Rz_r$ to less than 0.6. By setting the ratio of these to less than 0.6 while the surface roughness $Rz_r$ of the rough part 11 to 25 μm or greater, the difference between the rough part 11 and the smooth part 12 clearly appears, and visual recognition of information presented by the smooth part 12 (or the rough part 11) becomes easier. From the perspective of making the difference of these even clearer, the surface roughness $Rz_r$ of the rough part 11 is preferably 30 μm or greater or 35 μm or greater, and particularly preferably 40 μm or greater or 50 μm or greater. The upper limit of the surface roughness $Rz_r$ of the rough part 11 is not particularly limited; however, considering that printing product information or the like beautifully on the label 10 by using an ink composition 13, the upper limit is preferably 150 μm or less or 100 μm or less, and particularly preferably 80 μm or less. Furthermore, the surface roughness $Rz_a$ of the smooth part 12 is preferably 30 μm or less or 25 μm or less, and particularly preferably 15 μm or less. For example, the surface roughness $Rz_a$ of the smooth part 12 is preferably from 5 to 30 μm or from 10 to 25 μm. Furthermore, as the ratio of the surface roughnesses of the smooth part 12 to the rough part 11 ($Rz_a/Rz_r$) becomes a smaller value, the difference of these becomes even clearer. Because of this, the ratio of the surface roughnesses ($Rz_a/Rz_r$) is preferably 0.5 or less, more preferably 0.45 or less or 0.4 or less, and particularly preferably 0.35 or less or 0.3 or less.

Measurement Method of Surface Roughness

In the specification of the present application, unless otherwise noted, the surface roughness means ten point height of roughness profile (Rz). The surface roughness is measured by the following method.

By using a non-contact three-dimensional optical profiler (NewView 5010, available from Zygo Corporation), measurement is performed by setting the measurement area to 2 mm×2 mm and the magnification of the objective lens to 20 times and cutting the wavelength of 14 μm or less, and analysis is performed by using an analysis software (MetroPro, available from Zygo Corporation), and thus the obtained ten point height of roughness profile Rz (μm) is used as the surface roughness. Note that, when the adhering face of the label of the resin formed product is a curved shape, a sample is prepared by cutting the label adhered part of the resin formed product, the sample is fixed on a test stand by double-sided adhesive tape in a manner that the label part is a top face, and then measurement of the surface roughness is performed under the conditions described above.

The division of the rough part 11 and the smooth part 12 of the label 10 can be formed by, for example, performing hot-press treatment (heating and pressurizing treatment, also referred to as hot stamp treatment) based on the desired pattern of the smooth part 12 for a base sheet of the label 10, and then adhering the label 10 to the resin formed product 20 by in-mold molding. That is, for the label 10 after the hot-press treatment, there is almost no difference between the surface roughness of the part to which the hot-press treatment has been performed and the surface roughness of the other part. On the other hand, through the in-mold molding, the surface roughness of the part to which the hot-press treatment has not been performed increases and the part becomes the rough part 11, and the surface roughness of the part to which the hot-press treatment has been performed remains almost the same and the part becomes the smooth part 12. As described above, through both steps of the hot-press treatment and the in-mold molding processes, division of the rough part 11 and the smooth part 12 is formed on the label 10.

In the hot-press treatment, the conditions of heating and pressurizing the part corresponding to the smooth part 12 are preferably, for example, the following conditions. In other words, the pressurizing temperature is preferably from 110 to 150° C., and particularly preferably from 120 to 140° C. By setting the pressurizing temperature to 110° C. or higher, the thermoplastic resin contained in the label 10 is adequately melted, and the smooth part 12 that is smooth can be formed. Meanwhile, by suppressing the pressurizing temperature to 150° C. or lower, melting of the resin constituting the label 10 is prevented, and for example, the shape of the label 10 can be maintained. Furthermore, the pressurizing pressure is preferably 0.5 MPa or greater and, for example, is preferably from 0.5 to 10 MPa. By setting the pressurizing pressure to 0.5 MPa or greater under the temperature condition described above, the size and the number of fine voids contained in the porous base layer (A) and the porous adhesive layer (B1) of the label 10 are adequately reduced, and the porosity in that part is reduced.

As described below, the difference between surface roughnesses of the rough part 11 and the smooth part 12 is caused by the difference between the porosities of the parts; however, by performing the hot-press treatment in the part corresponding to the smooth part 12 under appropriate heating and pressurizing conditions, the difference between the surface roughnesses of the rough part 11 and the smooth part 12 becomes even clearer. On the other hand, by setting the pressurizing pressure to 10 MPa or less, cracking or breaking of the label during the hot-press treatment can be suppressed. Furthermore, the pressurizing time is, for example, preferably from 0.05 to 1 second, and suitably from 0.1 to 0.5 seconds. By setting the pressurizing time to an appropriate range, the smooth part 12 that is smooth can be formed without, for example, breaking the label.

By performing the hot-press treatment, the cross-sectional porosity of the label 10 in the hot-pressed part (corresponding to the smooth part 12) to which the hot-press treatment has been performed becomes lower than the cross-sectional porosity of the label 10 in the non-hot-pressed part (corresponding to the rough part 11) that is the other part. Furthermore, the non-hot-pressed part having a high cross-sectional porosity has a relatively large number of fine voids. Thus, when the label 10 is adhered to the resin formed product 20 by the in-mold molding, in the non-hot-pressed part, the material of the resin formed product follows the shrinkage generated by phase change from a semi-molten state to a solid state and crushes the voids, and at this time, fine wrinkles tend to occur on the surface or the inner part of the label 10. As a result, the label 10 after the in-mold molding has a rough surface roughness in the non-hot-pressed part and forms the rough part 11 described above. Conversely, in the hot-pressed part having a low cross-sectional porosity, fine wrinkles are less likely to occur on the surface or in the inner part thereof even after the in-mold molding. Thus, the hot-pressed part of the label 10 maintains the smooth surface roughness even after the in-mold molding and forms the smooth part 12 described above. In this way, by performing the hot-press treatment in a predetermined pattern on the label 10, the rough part 11 and the smooth part 12 can be formed on the label 10 after the in-mold molding.

Specifically, the cross-sectional porosity of the label in the hot-pressed part (smooth part 12) is preferably from 0 to 93% when the cross-sectional porosity of the label in the non-hot-pressed part (rough part 11) is 100%. Note that a condition where a proportion of the cross-sectional porosity is 0% is a condition where no voids are present in the hot-pressed part. From the perspective of pressurizing temperature and pressurizing time during the hot-press treatment, the proportion of the cross-sectional porosity is more preferably 30% or greater, even more preferably 50% or greater, and particularly preferably 70% or greater. Furthermore, from the visibility of the hot-pressed pattern, the proportion of the cross-sectional porosity is more preferably 93% or less, and even more preferably 82% or less. In this way, by setting the cross-sectional porosity of the label in the hot-pressed part to 93% or less relative to the non-hot-pressed part, clear difference is made in the wrinkles generated after the in-mold molding to the extent that the surface roughnesses of the rough part 11 and the smooth part 12 can be visually recognized.

More specifically, when the cross-sectional porosity of the label in the hot-pressed part (smooth part 12) is separately measured, the cross-sectional porosity is preferably from 0 to 31%, and particularly preferably from 20 to 29%. Similarly, the cross-sectional porosity of the label in the non-hot-pressed part (rough part 11) is preferably from 32 to 50%, and particularly preferably from 32 to 37%.

Measurement Method of Cross-Sectional Porosity

In the specification of the present application, "cross-sectional porosity of the label" is a cross-sectional porosity in a thickness direction of the entire label. That is, in an embodiment of the present invention, the label 10 is formed from the porous base layer (A) and the adhesive layer (B), the cross-sectional porosity of each layer is not separately measured but the cross-sectional porosity of the entire label 10 including both of the layers is measured. The cross-sectional porosity of the label is determined by taking an electron micrograph of the label cross section, and determining the area proportion (%) of voids (pores) in the cross-sectional region taken in the electron micrograph. Specifically, a sample is formed by cutting a freely chosen part of a sample of a label adhered to a resin formed product or a single label, this sample is embedded in an epoxy resin and solidified. Then, a cut face that is in parallel with a thickness direction of the label (that is, vertical in a plane direction) is prepared by using a microtome, and this cut face is metalized by vapor deposition. Thereafter, a photograph taken by magnifying to any magnification (e.g., from 500 times to 3000 times) that facilitates observation by the electron microscope is subjected to binarization treatment and image treatment by the image analyzer described above. Thus, the area proportion (%) of the voids in the measurement range is determined and used as the cross-sectional porosity (%) in the thickness direction of the label. Note that a remarkable difference in the cross-sectional porosities of the labels does not occur even in a case where a label after being adhered to a resin formed product by in-mold molding is measured or even when a case where a label before being adhered to a resin formed product is measured. Because of this, any of the label before the in-mold molding or the label after the in-mold molding may be used as a sample for cross-sectional porosity measurement.

2. Second Embodiment

Figure 3:
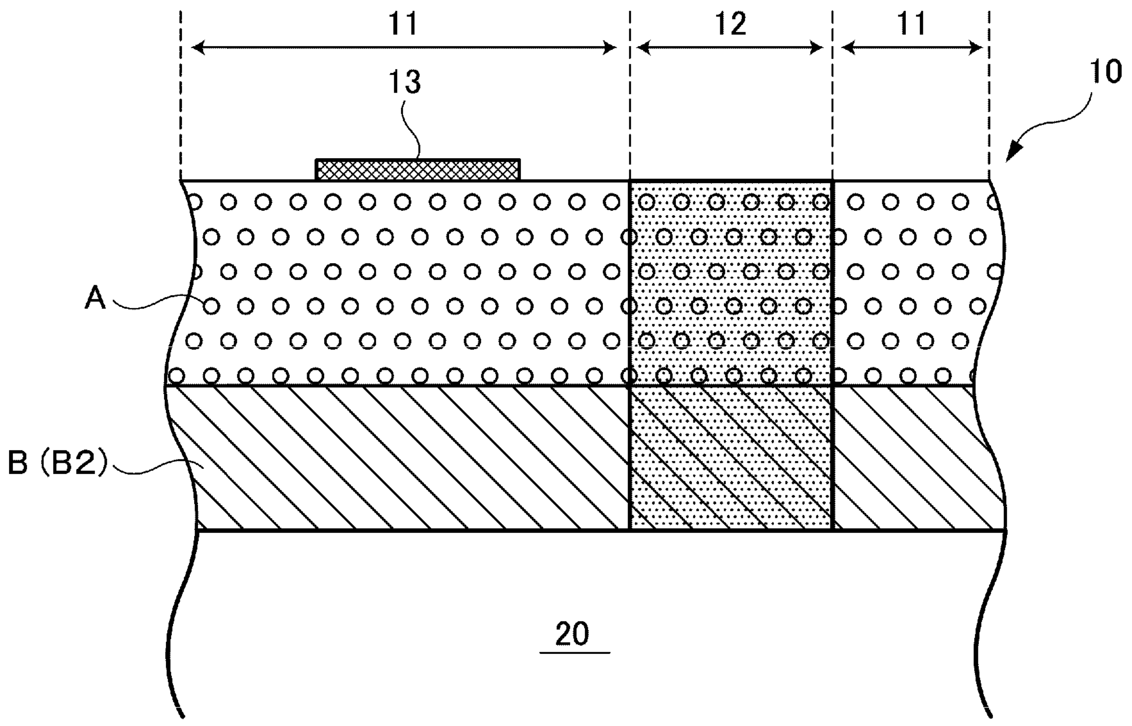
FIG. 3 schematically illustrates a cross sectional structure of a resin formed product with a label according to the second embodiment.

FIG. 3 illustrates the resin formed product with a label according to the second embodiment of the present invention. For the second embodiment, description of configuration that is common with that of the first embodiment described above will be omitted, and configuration that is differ from that of the first embodiment will be mainly described. The second embodiment is in common with the first embodiment in that the label 10 is formed from the porous base layer (A) and the adhesive layer (B); however, in place of the porous adhesive layer (B1), a heat seal layer (B2) having no voids in the layer is used as the adhesive layer (B). Note that, from the perspective of the rough part 11 and the smooth part 12 being formed on the label 10, the first embodiment is in common with the second embodiment. The description of the porous base layer (A), the rough part 11, and the smooth part 12 of the first embodiment can be referred for the second embodiment.

2-1. Heat Seal Layer (B2)

The heat seal layer (B2) is a layer to adhere the label 10 and the resin formed product 20. The heat seal layer (B2) is formed from a thermoplastic resin. The heat seal layer (B2) is solid at normal temperature; however, the heat seal layer (B2) is activated by heat of a molten resin to form the resin formed product 20 in a mold during in-mold molding and fused with the molten resin, and exhibits strong adhesive force by becoming a solid again after cooling. In this embodiment, the adhesive layer (B) does not have voids in the layer.

The thermoplastic resin constituting the heat seal layer (B2) preferably has a melting point determined as a peak temperature by DSC measurement from 60 to 130° C. When the melting point is lower than 60° C., slipping characteristic of the label is deteriorated due to stickiness at normal temperature and, for example, blocking tends to occur. Therefore, when the label is inserted to a mold, troubles such as inserting two sheets tend to occur frequently. Furthermore, when the melting point is higher than 130° C., adhesiveness between the label and the formed product tends to be poor.

An example of thermoplastic resin constituting the heat seal layer (B2) is a polyolefin-based resin. More specifically, a polyethylene-based resin having a melting point from 60 to 130° C., such as a high pressure processed polyethylene having a low density or medium density, a straight chain polyethylene, ethylene, an α-olefin copolymer, a propylene-α-olefin copolymer, an ethylene-vinyl acetate copolymer, an ethylene-acrylic acid copolymer, an ethylene-acrylic acid alkyl ester copolymer, an ethylene-methacrylic acid alkyl ester copolymer (the alkyl group having from 1 to 8 carbons), or a metal salt (such as Zn, Al, Li, K, and Na) of an ethylene-methacrylic acid copolymer, can be used. One type of these resins may be used alone, or two or more types of these resins may be mixed and used. Furthermore, other known additives for resins may be optionally added to the heat seal layer (B2) in a range that does not impair the performance required for the heat seal layer. Examples of such additives include dyes, nucleating agents, plasticizers, releasing agents, antioxidants, antiblocking agents, flame retardants, ultraviolet absorbers, and dispersants.

In this manner, in a case where the heat seal layer (B2) is used as the adhesive layer (B), similarly to the first embodiment, after hot-press treatment with a predetermined pattern has been performed on the label 10, the label 10 is adhered to the resin formed product 20 by in-mold molding. By this, the hot-pressed part of the label 10 becomes the smooth part 12 having a relatively smooth surface roughness, and the other part becomes the rough part 11 having a rough surface roughness. Thus, the predetermined pattern of the smooth part 12 of the label 10 adhered to the resin formed product 20 can be visually recognized and, by this, information can be presented to, for example, a user. Therefore, even in a case where the heat seal layer (B2) is used, information can be provided on the label 10 without using ink and the information can be visually recognized from the external appearance even in a condition where the label 10 is adhered to the resin formed product 20, and thus problems of technologies in the related art can be solved.

However, unlike the porous adhesive layer (B1) described above, in the heat seal layer (B2), when the label 10 is released from the resin formed product 20, a phenomenon in which the heat seal layer (B2) is divided into two and remained on the surface of the resin formed product 20 is less likely to occur. Therefore, in a case where the heat seal layer (B2) is used as the adhesive layer (B), a phenomenon in which a pattern corresponding to the smooth part 12 is formed on each of the released part 10*a* and the remained part 10*b* of the label 10, like the case where the porous adhesive layer (B1) is used, is less likely to occur. Thus, for this point, the first embodiment can be said to be more advantageous than the second embodiment.

Note that, although illustration is omitted, as the adhesive layer (B), a structure in which the porous adhesive layer (B1) and the heat seal layer (B2) are laminated can be also employed. In this case, in the order from the front surface side, the porous base layer (A), the porous adhesive layer (B1), and the heat seal layer (B2) are preferably laminated. In this case, the heat seal layer (B2) serves a role of reinforcing the adhesive force between the label 10 and the resin formed product 20.

3. Production Method of Resin Formed Product with Label

Figure 4:
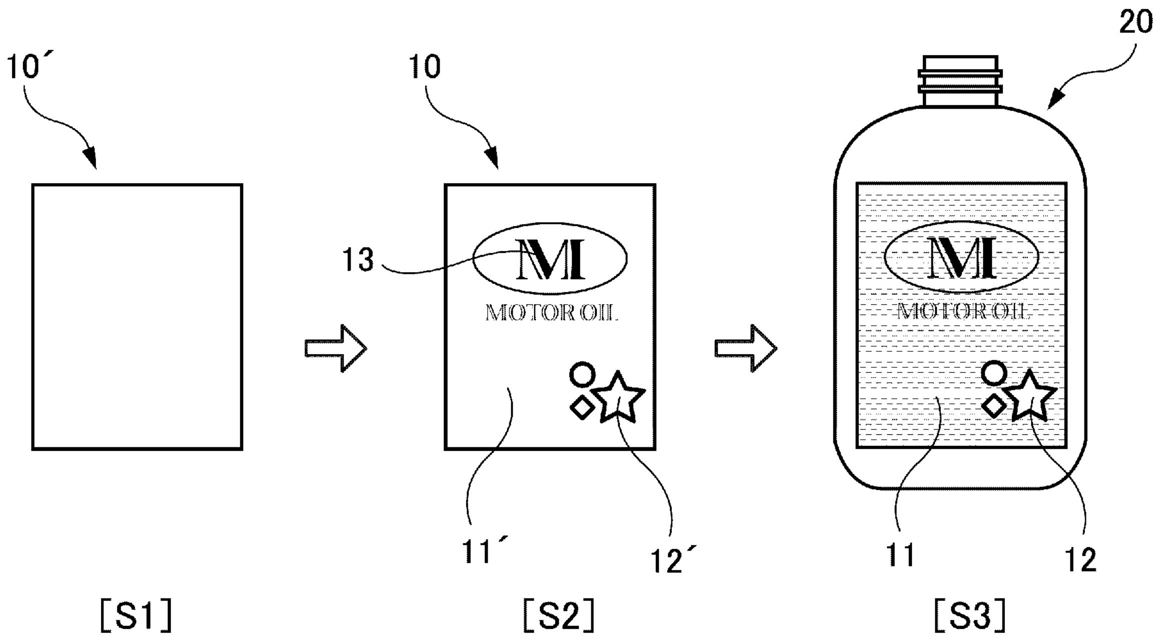
FIG. 4 schematically illustrates production steps of a resin formed product with a label.

FIG. 4 schematically illustrates a production method of a resin formed product with a label. The production method described herein can be applied to both of the first embodiment and the second embodiment.

First, a base sheet 10' of the label is prepared (step S1). This base sheet 10' is processed into a desired shape and size by cutting or punching. The base sheet 10' of the label has a structure in which the porous base layer (A) and the adhesive layer (B) are laminated as described above. The porous adhesive layer (B1), the heat seal layer (B1), or a combination of these can be used as the adhesive layer (B). Note that the base sheet 10' may be produced by a method known as a production method of a laminate film, such as a coextrusion method, a coextrusion lamination method, a film adhering method, and a coating method.

Second, while optional printing is performed by coating the ink composition 13 on the surface of the porous base layer (A) side of the base sheet 10' that has been processed into the desired shape and size, hot-press treatment having a predetermined pattern is performed from the front surface side or the back surface side of the base sheet 10', and thus a hot-pressed part 12' and a non-hot-pressed part 11' are formed (step S2). Suitable conditions of the pressurizing temperature, pressurizing pressure, and pressurizing time of the hot-press treatment are as described above. By this step, the label 10 for in-mold molding is prepared. Note that the printing treatment by the ink composition 13 and the hot-press treatment are typically performed as separate steps by using separate devices; however, it is also possible to simultaneously perform the printing treatment and the hot-press treatment by an identical device. Furthermore, the processing treatment such as cutting or punching of the label base sheet 10', printing treatment of the base sheet 10', and hot-press treatment described above may be performed in any order. For example, the printing treatment, the hot-press treatment, and the processing treatment may be performed in this order, the printing treatment, the processing treatment, and the hot-press treatment may be performed in this order, or another order may be employed.

The label 10 prepared as described above has a relatively low cross-sectional porosity in the hot-pressed part 12' and a relatively high cross-sectional porosity in the non-hot-pressed part 11' as described above. However, at this stage, a remarkable difference is not generated between the surface roughnesses of the hot-pressed part 12' and the non-hot-pressed part 11'. Note that the hot-pressed part 12' has a little smaller thickness of the label 10 compared to that of the non-hot-pressed part 11', and thus a slight step can be formed between these. Because of this, even at this stage, using this step as a boundary, the hot-pressed part 12' and the non-hot-pressed part 11' can be also distinguished.

Third, the label 10 that has been subjected to the hot-press treatment is adhered to a surface of a resin formed product 20 by in-mold molding (step S3). That is, the label 10 is inserted in a mold in a manner that the porous base layer (A) side is the inner wall surface side of the mold and the adhesive layer (B) side is in contact with the molten resin, and thus a resin formed product with a label is produced by in-mold molding method. In the in-mold molding method, a resin formed product such as a container can be formed in a mold by a known method such as injection forming, blow forming, differential pressure forming, and foam molding. For example, direct blow molding in which a molten resin parison is press-fit in a mold inner wall by pressurized air or stretch blow molding using a preform is preferably performed. However, in addition, injection molding in which the molten resin is injected into a mold by an injection device and then cooled and solidified can be also performed.

By performing the in-mold molding, the label follows the shrinkage of the resin formed product to which the label is adhered during forming, and fine wrinkles are formed on the surface of the label 10. In a case where the adhesive layer (B) is formed by the porous adhesive layer (B1), similarly, fine wrinkles are formed on the porous adhesive layer (B1). With this, in the non-hot-pressed part 11' having a relatively high cross-sectional porosity, the surface roughness becomes rough due to the fine wrinkles on the surface. Meanwhile, the hot-pressed part 12' having a relatively low cross-sectional porosity is not affected as much as the non-hot-pressed part 11', and the surface roughness is maintained as relatively smooth. By this, in the label 10 adhered to the resin formed product 20, the rough part 11 corresponding to the non-hot-pressed part 11' and the smooth part 12 corresponding to the hot-pressed part 12' are formed. As a result, due to the difference between the surface roughnesses (specifically, reflectances of light) of the rough part 11 and the smooth part 12, for example, a predetermined pattern formed by the smooth part 12 stands out and can be seen. By this pattern of the smooth part 12, various information can be presented to consumers.

EXAMPLES

The present invention will be described more specifically below referring to Examples and Comparative Examples. The materials, used amounts, proportions, treatment contents, treatment procedures, and the like may be varied as appropriate provided that they do not deviate from the spirit of the present invention. Therefore, the scope of the present invention should not be limited by the specific examples given below. Note that, for Examples and Comparative Examples, hot-press conditions, surface roughness after in-mold molding, and visibility of hot-pressed pattern after in-mold molding are collectively listed in Table 1.

Production Example 1 of Label Base Sheet

A resin composition (a1) for a porous base layer (A) formation formed from 69 mass % of a crystalline polypropylene resin (trade name: Novatec PP FY4, available from Japan Polypropylene Corporation, MFR: 5 g/10 min (230° C., load of 2.16 kg), 30 mass % of heavy calcium carbonate (trade name: Softon 1800, available from Bihoku Funka Kogyo Co., Ltd., dry pulverized product, average particle size: 1.25 μm (air permeability method)) as inorganic fillers, and 1 mass % of a dispersant (oleic acid) was melt-kneaded in an extruder set at 250° C., extrusion-molded in a sheet shape through a die, and cooled to 70° C. by a cooling device, and thus a monolayer unstretched sheet of the composition (a1) was obtained. This unstretched sheet was heated again to 145° C. and then stretched 5-fold in the machine-direction by utilizing the circumferential speed differential of multiple rollers, and thus a machine-direction uniaxially stretched film was obtained.

Separately from this, a resin composition (b1) for a porous adhesive layer (B1) formation formed from 16 mass % of a crystalline polypropylene resin (trade name: Novatec PP FY4, available from Japan Polypropylene Corporation, MFR: 5 g/10 min (230° C., load of 2.16 kg), 19.5 mass % of a high density polyethylene (trade name: Novatec HJ590N, available from Japan Polyethylene Corporation, MFR: 40 g/10 min (190° C., load of 2.16 kg)) as a thermoplastic resin that is immiscible with the crystalline polypropylene resin, 62 mass % of light calcium carbonate (trade name: YM30, available from Maruo Calcium Co., Ltd., average particle size: 0.3 μm) as inorganic fillers, 0.5 mass % of a dispersant (oleic acid), and 2 mass % of maleic acid-modified polypropylene (trade name: MODIC P908, available from Mitsubishi Chemical Corporation, softening point: 140° C.) was melt-kneaded in an extruder set at 250° C., extruded in a sheet shape through a die, and laminated on one face of the machine-direction uniaxially stretched film, and thus a laminate having a two-layer structure of (a1)/(b1) was obtained.

Then, the laminate was heated again to 153° C. by using an oven, and stretched 9-fold in the transverse direction by using a tenter stretching machine, and thus a label base sheet 1 of Production Example 1, which was biaxially stretched/uniaxially stretched, was obtained. The thickness of the label base sheet 1 was 105 μm, and the cross-sectional porosity was 32%.

Production Example 2 of Label Base Sheet

A label base sheet 2 was obtained in the same manner as in Production Example 1 except for adjusting the cross-sectional porosity to 27% by increasing the extruded amount of the single unstretched sheet and increasing the temperature during the transverse-direction stretching by 5° C. to make the temperature 158° C. in Production Example 1 of the label base sheet. Note that the thickness of the label base sheet 2 was adjusted to 105 μm.

Production Example 3 of Label Base Sheet

A label base sheet 3 was obtained in the same manner as in Production Example 1 except for adjusting the cross-sectional porosity to 19% by increasing the extruded amount of the single unstretched sheet and increasing the temperature during the transverse-direction stretching by 10° C. to make the temperature 163° C. in Production Example 1 of the label base sheet. Note that the thickness of the label base sheet 3 was adjusted to 105 μm.

Label Production Example 1

The label base sheet 1 obtained in Production Example 1 of label base sheet was punched out to a size of 109 mm width and 171 mm length and pressurized for 0.1 seconds in a die having a predetermined pattern and being heated to 120° C. from the face of the porous base layer (A) by using a hot press machine (available from Navitas, model: V-08C), and thus a label was prepared. The height position was adjusted in a manner that the pressure during the pressurization was from 1 to 5 MPa.

Label Production Examples 2 to 11 and 13 to 15

A label was prepared in the same manner as in Example 1 except for changing the hot-press treatment conditions of Label Production Example 1 to those listed in Table 1.

Label Production Example 12

The label base sheet 2 obtained in Production Example 2 of label base sheet was punched out to a size of 109 mm width and 171 mm length and pressurized for 0.3 seconds in a die having a predetermined pattern and being heated to 130° C. from the face of the porous base layer (A) by using a hot press machine (available from Navitas, model: V-08C), and thus a label was prepared.

Label Production Example 16

The label base sheet 3 obtained in Production Example 3 of label base sheet was punched out to a size of 109 mm width and 171 mm length and pressurized for 0.5 seconds in a die having a predetermined pattern and being heated to 140° C. from the face of the porous base layer (A) by using a hot press machine (available from Navitas, model: V-08C), and thus a label was prepared.

Examples 1 to 12 and Comparative Examples 1 to 3

By using a blow forming device (available from Placo Co. Ltd., model: V-50), an automatic label feeder (available from Pentel Co., Ltd.), and a split mold for blow forming that can provide a bottle container having an internal volume of 1000 mL, each of the label obtained in Label Production Examples 1 to 16 described above was fixed to one of the split molds for blow forming in a manner that the porous base layer (A) side is in contact with the mold by using vacuum. A high density polyethylene (available from Japan Polyethylene Corporation, trade name: Novatec HD HB330, melting point: 133° C.) was melt-extruded at 200° C. as a parison. The parison was introduced into the split mold, the split mold was clamped, then a pressurized air of 4.2 kg/cm$^2$ was fed into the parison to expand the parison in a manner that the parison is in close contact with the mold to form a container shape and to adhere the label thereto. Thereafter, the mold was cooled with cooling water at 10° C., then the mold was opened after approximately 10 seconds to take out the hollow container formed product to which the label was adhered, and this was used as the resin container (resin formed product) with the label.

Figure 5:
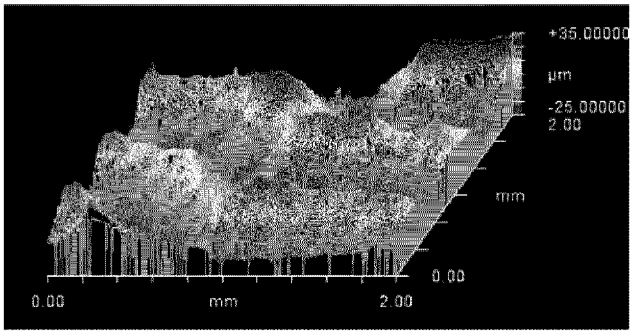
FIG. 5 illustrates surface roughnesses of resin formed products with labels according to Examples and Comparative Example.
Figure 5:
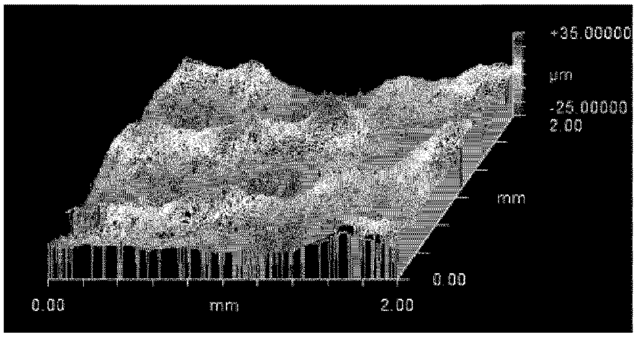
Figure 5:
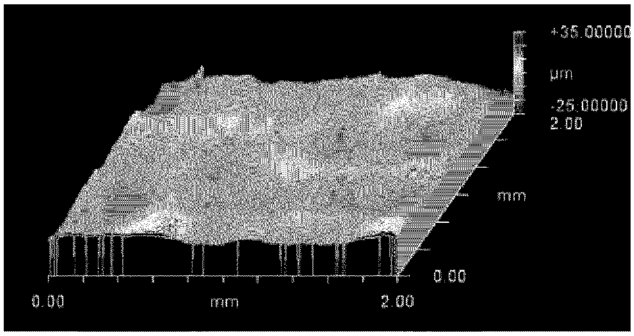
Figure 5:
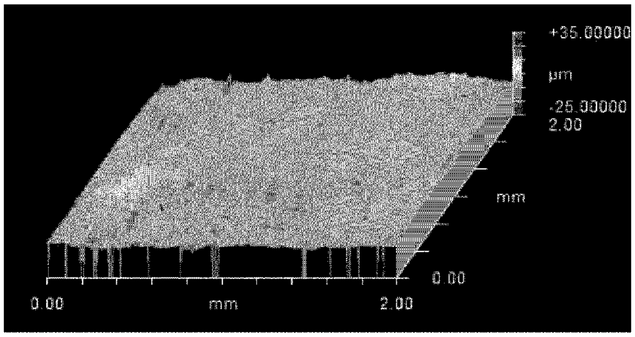

Using the obtained resin containers with labels, surface roughnesses of the rough part and the smooth part (ten point height of roughness profile), cross-sectional porosities of the rough part and the smooth part, and visibility of the hot-pressed pattern were evaluated. The evaluation results for Examples and Comparative Examples are shown in Table 1. Furthermore, in FIG. 5, for images showing surface roughness of the resin container with the label analyzed by using a non-contact three-dimensional optical profiler (NewView 5010, available from Zygo Corporation) and the analysis software thereof (MetroPro, available from Zygo Corporation), an image of the rough part is shown as Reference Example and images of the smooth parts of Comparative Example 3, Example 4, and Example 5 are shown.

Cross-Sectional Porosity

After the label part of the resin container with the label was cut and embedded in an epoxy resin and solidified, a cut face that was in parallel with a thickness direction of the label (that is, vertical in a plane direction) was prepared by FIB treatment by using a microtome. After this cut face was metalized by vapor deposition, a photograph was taken for the observed region that was magnified to 3000 times by using an electron microscope (Scanning Electron Microscope S-2400, available from Hitachi, Ltd.) and was subjected to image treatment in a manner that two regions, a void region and a solid region such as the thermoplastic resin composition and inorganic fillers contained in the label, were formed by the image analyzer (available from Nireco Corporation, model: LUZEX IID). A value obtained by dividing the area of the void region in the label by the area of the entire label was used as the cross-sectional porosity.

Visibility of hot-pressed pattern after in-mold molding

After the in-mold molding, the predetermined pattern that was subjected to the hot-press treatment in advance was visually observed from the label external appearance and evaluated based on the following criteria.

A: The predetermined pattern part was smooth and clearly recognized.

B: The predetermined pattern was slightly recognized.

C: The position of the predetermined pattern was not recognized.

As shown in Table 1, when the ratio of the cross-sectional porosity of the smooth part to the cross-sectional porosity of the rough part was 94% or greater, visibility of the hot-pressed pattern was low, and the position of the predetermined pattern was not recognized. Therefore, from the perspective of visibility of the hot-pressed pattern, the ratio of the cross-sectional porosity of the smooth part to the cross-sectional porosity of the rough part is preferably 93% or less.

TABLE 1

| | Label base sheet Production Example | Label Production Example | Hot-press treatment conditions: Treated face | Hot-press treatment conditions: Pressurizing temperature (° C.) | Hot-press treatment conditions: Pressurizing time (second) | Surface roughness: $Rz_r$ | Surface roughness: $Rz_a$ | Surface roughness: $Rz_a/Rz_r$ | Ratio of porosity: Smooth part/rough part | Visibility of hot-pressed pattern |
|---|---|---|---|---|---|---|---|---|---|---|
| Example 1 | Production | Production Example 1 | Porous base | 120 | 0.1 | 54 | 27 | 0.5 | 91 | B |
| Example 2 | Example 1 | Production Example 2 | layer (A) face | | 0.3 | 54 | 23 | 0.4 | 84 | B |
| Example 3 | | Production Example 3 | | | 0.5 | 54 | 18 | 0.3 | 81 | A |
| Example 4 | | Production Example 4 | | 130 | 0.1 | 54 | 22 | 0.4 | 91 | B |
| Example 5 | | Production Example 5 | | | 0.3 | 54 | 18 | 0.3 | 81 | A |
| Example 6 | | Production Example 6 | | | 0.5 | 54 | 15 | 0.3 | 78 | A |
| Example 7 | | Production Example 7 | | 140 | 0.1 | 54 | 20 | 0.4 | 88 | B |
| Example 8 | | Production Example 8 | | | 0.3 | 54 | 14 | 0.3 | 81 | A |
| Example 9 | | Production Example 9 | | | 0.5 | 54 | 14 | 0.3 | 75 | A |
| Example 10 | | Production Example 10 | Porous adhesive | 130 | 0.3 | 54 | 22 | 0.4 | 88 | B |
| Example 11 | | Production Example 11 | layer (B) face | | 0.5 | 54 | 18 | 0.3 | 81 | |

TABLE 1-continued

| | Label base sheet Production Example | Label Production Example | Hot-press treatment conditions: Treated face | Pressurizing temperature (° C.) | Pressurizing time (second) | Surface roughness: $Rz_r$ | $Rz_a$ | $Rz_a/Rz_r$ | Ratio of porosity: Smooth part/rough part | Visibility of hot-pressed pattern |
|---|---|---|---|---|---|---|---|---|---|---|
| Example 12 | Production Example 2 | Production Example 12 | Porous base layer (A) face | | 0.3 | 38 | 15 | 0.4 | 81 | B |
| Comparative Example 1 | Production Example 1 | Production Example 14 | Porous adhesive layer (B) face | 130 | 0.1 | 54 | 50 | 0.9 | 97 | C |
| Comparative Example 2 | | Production Example 15 | | 140 | 0.1 | 54 | 43 | 0.8 | 97 | C |
| Comparative Example 3 | Production Example 3 | Production Example 16 | Porous base layer (A) face | | 0.5 | 18 | 11 | 0.6 | 94 | C |

As described above, in the specification of the present application, embodiments and examples of the present invention are described with reference to drawings to express contents of the present invention. However, the present invention is not limited to the embodiments and examples described above and includes modified embodiments and improved embodiments that are obvious to a person skilled in the art based on the items described in the specification of the present invention.

REFERENCE SIGNS LIST

10 . . . Label
10*a* . . . Released part
10*b* . . . Remained part
11 . . . Rough part
11' . . . Non-hot-pressed part (first part)
12 . . . Smooth part
12' . . . Hot-pressed part (second part)
12*a* . . . Surface pattern
12*b* . . . Mirror image pattern
12*c* . . . Identical pattern
13 . . . Ink composition
20 . . . Resin formed product
A . . . Porous base layer
B . . . Adhesive layer
B1 . . . Porous adhesive layer
B2 . . . Heat seal layer

The invention claimed is:

1. A resin formed product, the resin formed product being a resin formed product (20) to which a label (10) is adhered, the label being formed by laminating a layer containing a porous base layer (A) and an adhesive layer (B) adhered to a surface of the resin formed product, the label has a rough part (11) having a relatively rough surface roughness and a smooth part (12) having a predetermined pattern (12*a*) having a relatively smooth surface roughness, and a cross-sectional porosity of the label of the smooth part being from 0 to 93% relative to the cross-sectional porosity of the label of the rough part.

2. The resin formed product according to claim 1, wherein when the surface roughness of the rough part (11) is $Rz_r$ and the surface roughness of the smooth part (12) is $Rz_a$, the $Rz_r$ is 25 μm or greater, and $Rz_a/Rz_r$ is less than 0.6.

3. The resin formed product according to claim 1, wherein the smooth part (12) is formed by heating and pressuring the label (10) from a front surface side or a back surface side.

4. The resin formed product according to claim 1, wherein the adhesive layer (B) has a porous adhesive layer (B1), and when the label is released from the resin formed product by splitting the porous adhesive layer, patterns (12*b*, 12*c*) corresponding to the smooth part appear on a released face of the released part (10*a*) of the label that has been released from the resin formed product and a released face of the remained part (10*b*) of the label that remains on the resin formed product.

5. The resin formed product according to claim 1, wherein the adhesive layer (B) has a heat seal layer (B2).

* * * * *